US008905167B2

(12) United States Patent
Zhou et al.

(10) Patent No.: US 8,905,167 B2
(45) Date of Patent: Dec. 9, 2014

(54) ENGINE START CONTROL SYSTEM FOR AN ELECTRICALLY VARIABLE TRANSMISSION

(75) Inventors: Jing Zhou, Auburn Hills, MI (US); Goro Tamai, West Bloomfield, MI (US); Feisel Weslati, Troy, MI (US); Nadirsh Patel, Farmington Hills, MI (US); Ashish Krupadanam, Cupertino, CA (US)

(73) Assignee: Chrysler Group LLC, Auburn Hills, MI (US)

( * ) Notice: Subject to any disclaimer, the term of this patent is extended or adjusted under 35 U.S.C. 154(b) by 169 days.

(21) Appl. No.: 13/547,599

(22) Filed: Jul. 12, 2012

(65) Prior Publication Data

US 2013/0080038 A1   Mar. 28, 2013

Related U.S. Application Data

(60) Provisional application No. 61/513,061, filed on Jul. 29, 2011.

(51) Int. Cl.

| | |
|---|---|
| B60W 10/08 | (2006.01) |
| B60W 10/02 | (2006.01) |
| B60W 10/06 | (2006.01) |
| F02N 15/00 | (2006.01) |
| B60K 6/445 | (2007.10) |
| B60W 50/00 | (2006.01) |
| B60W 20/00 | (2006.01) |

(52) U.S. Cl.
CPC ........ *F02N 15/00* (2013.01); *B60W 2710/0644* (2013.01); *B60W 2050/0008* (2013.01); *B60W 10/02* (2013.01); *Y02T 10/48* (2013.01); *B60W 2710/083* (2013.01); *Y02T 10/6286* (2013.01); *B60W 10/06* (2013.01); *B60W 2510/0638* (2013.01); *B60W 20/40* (2013.01); *Y02T 10/6239* (2013.01); *B60W 2050/0012* (2013.01); *B60W 10/08* (2013.01); *B60W 20/00* (2013.01); *B60W 2510/0275* (2013.01); *B60K 6/445* (2013.01)

USPC ............... 180/65.265; 180/65.285; 180/65.28

(58) Field of Classification Search
CPC ...... B60W 20/40; B60W 10/06; B60W 10/08
USPC .............................. 180/65.28, 65.285, 65.265
See application file for complete search history.

(56) References Cited

U.S. PATENT DOCUMENTS

| | | | | |
|---|---|---|---|---|
| 7,734,401 B2 * | 6/2010 | Joe et al. | ........................ | 701/54 |
| 7,753,150 B2 * | 7/2010 | Tamor | ..................... | 180/65.265 |

(Continued)

FOREIGN PATENT DOCUMENTS

| | | |
|---|---|---|
| EP | 0780256 A2 | 6/1997 |
| EP | 1447255 A2 | 8/2004 |
| FR | 2922176 A1 | 4/2009 |

*Primary Examiner* — Jeffrey J Restifo
(74) *Attorney, Agent, or Firm* — Ralph E Smith

(57) ABSTRACT

A system and method of controlling first and second electric motors of a vehicle having an electrically variable transmission during an engine start/stop operation. The system and method determine an input speed profile and an input acceleration profile based on an optimum engine speed, determine a requested output torque based on a plurality of torque limits and a desired output torque, determine first and second feedforward motor torques based on a requested output torque and the input speed and input acceleration profiles, determine first and second feedback motor torques based on a difference between the input speed profile and an actual input speed, and using the feedforward and feedback first and second motor torques to control the operation of the first and second electric motors when an engine is being turned on or off.

17 Claims, 4 Drawing Sheets

(56) References Cited

U.S. PATENT DOCUMENTS

| | | | |
|---|---|---|---|
| 7,784,575 B2* | 8/2010 | Yamanaka et al. | 180/65.275 |
| 7,896,114 B2* | 3/2011 | Colvin et al. | 180/65.28 |
| 7,967,091 B2* | 6/2011 | Yamazaki et al. | 180/65.225 |
| 7,983,823 B2* | 7/2011 | Heap | 701/51 |
| 7,987,934 B2* | 8/2011 | Huseman | 180/65.21 |
| 8,002,055 B2* | 8/2011 | Hashimoto | 180/65.21 |
| 8,010,247 B2* | 8/2011 | Heap et al. | 701/22 |
| 8,103,397 B2* | 1/2012 | Liang et al. | 701/22 |
| 8,157,035 B2* | 4/2012 | Whitney et al. | 180/65.265 |
| 8,167,064 B2* | 5/2012 | Iwase et al. | 180/65.265 |
| 8,224,539 B2* | 7/2012 | Heap | 701/54 |
| 8,224,544 B2* | 7/2012 | Sah et al. | 701/68 |
| 8,234,048 B2* | 7/2012 | Buur et al. | 701/53 |
| 8,261,864 B2* | 9/2012 | Bhattarai et al. | 180/65.285 |
| 8,281,885 B2* | 10/2012 | Zettel et al. | 180/65.285 |
| 8,290,681 B2* | 10/2012 | Kaminsky et al. | 701/99 |
| 8,387,730 B2* | 3/2013 | Bouchon | 180/65.265 |
| 8,403,807 B2* | 3/2013 | Tabata et al. | 477/3 |
| 8,414,449 B2* | 4/2013 | Heap et al. | 477/5 |
| 8,448,731 B2* | 5/2013 | Heap et al. | 180/65.28 |
| 8,473,133 B2* | 6/2013 | Wang et al. | 701/22 |
| 8,527,123 B2* | 9/2013 | Chrostowski et al. | 701/22 |
| 8,528,676 B2* | 9/2013 | Endo et al. | 180/65.285 |
| 8,534,399 B2* | 9/2013 | Soliman et al. | 180/65.21 |
| 8,660,726 B2* | 2/2014 | Kim et al. | 701/22 |
| 2008/0275624 A1* | 11/2008 | Snyder | 701/104 |
| 2014/0088805 A1* | 3/2014 | Tulpule et al. | 701/22 |

\* cited by examiner

| POINT(S) | DESCRIPTION |
|---|---|
| A | VEHICLE STARTS IN IB-EV MODE. MOTORS A AND B PROPEL THE VEHICLE |
| A TO B | VEHICLE OPERATES IN IB-EV MODE. MOTORS A AND B PROPEL THE VEHICLE |
| B | IB-EV TO OD-EV SHIFT. MOTOR B PROPELS THE VEHICLE |
| B TO C | OD-EV MODE. MOTOR B PROPELS THE VEHICLE. MOTOR A ACCELERATES THE ENGINE |
| C | ENGINE STARTS. OD-EV TO OD-EO TRANSITION |
| C TO D | OD-EO MODE. ENGINE AND MOTORS PROPEL THE VEHICLE |
| D | OD-EO TO UD-EO SHIFT |
| D TO E | UD-EO MODE. ENGINE AND MOTORS PROPEL THE VEHICLE. HIGHER RATIO FROM ENGINE TO OUTPUT |
| E | UD-EO TO OD-EO SHIFT |
| E TO F | OD-EO MODE. ENGINE AND MOTORS PROPEL THE VEHICLE. LOWER RATIO FROM ENGINE TO OUTPUT |
| F | ENGINE SHUT-OFF. OD-EO TO OD-EV TRANSITION. MOTOR B PROPELS THE VEHICLE OR PROVIDES REGENERATIVE BRAKING AS NEEDED |
| F TO G | OD-EV MODE. MOTOR B PROPELS THE VEHICLE OR PROVIDES REGENERATIVE BRAKING AS NEEDED. MOTOR A SPINS ENGINE DOWN TO ZERO SPEED |
| G | OD-EV TO IB-EV SHIFT. BOTH MOTORS A AND B PROVIDE REGENERATIVE BRAKING (OR PROPULSION) AS NEEDED |
| G TO H | IB-EV MODE. BOTH MOTORS A AND B PROVIDE REGENERATIVE BRAKING (OR PROPULSION) AS NEEDED |
| H | VEHICLE STOPS IN IB-EV MODE |

FIG. 3

ENGINE START CONTROL SYSTEM FOR AN ELECTRICALLY VARIABLE TRANSMISSION

CROSS-REFERENCE TO RELATED APPLICATION

This application claims the benefit of U.S. Provisional Application No. 61/513,061, filed Jul. 29, 2011.

FIELD

The present disclosure relates to the control of an automotive transmission, specifically to an engine start control system and method for a vehicle having an electrically variable transmission.

BACKGROUND

Some current hybrid electrically variable transmissions feature two electric motors coupled to an internal combustion engine utilizing a plurality of clutches and gear sets. At certain times it is desirable to operate the transmissions in strictly an electric mode or in a hybrid mode where the internal combustion engine and one or both motors operate simultaneously. Managing the many parameters such as clutch, engine and motor torques, battery power levels and usage, efficiency and smooth shifting between the various gears and drive modes, fuel economy, operational-cost efficiency, etc. pose many operational control challenges.

Thus, there remains a need for continuous improvement in the operational control of hybrid electrically variable transmissions.

SUMMARY

In one form, the present disclosure provides an engine start control system for a vehicle having an electrically variable transmission. The control system comprises a supervisory controller adapted to input vehicle operating conditions and driver inputs, said supervisory controller adapted to determine and output a plurality of torque limits, a desired output torque, and an optimum engine speed; an input speed profiler adapted to generate and output an input speed profile and an input acceleration profile based on the optimum engine speed; a constraints evaluator adapted to generate and output a requested output torque based on the plurality of torque limits and desired output torque; a feedforward controller adapted to generate first and second feedforward motor torques based on the requested output torque and the input speed and input acceleration profiles; and a feedback controller adapted to generate first and second feedback motor torques based on a difference between the input speed profile and an actual input speed. The feedforward and feedback first and second motor torques are used to control the operation of the first and second electric motors when the engine is being turned on or off.

The present disclosure also provides a method of controlling first and second electric motors of a vehicle having an electrically variable transmission during an engine start/stop operation. The disclosed method comprises using a processor to perform the steps of determining an input speed profile and an input acceleration profile based on an optimum engine speed; determine a requested output torque based on a plurality of torque limits and a desired output torque; determine first and second feedforward motor torques based on a requested output torque and the input speed and input acceleration profiles; determine first and second feedback motor torques based on a difference between the input speed profile and an actual input speed; and using the feedforward and feedback first and second motor torques to control the operation of the first and second electric motors when the engine is being turned on or off.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

FIG. 3 is a table describing the various drive cycle points illustrated in FIG. 2;

DETAILED DESCRIPTION

Figure 1:
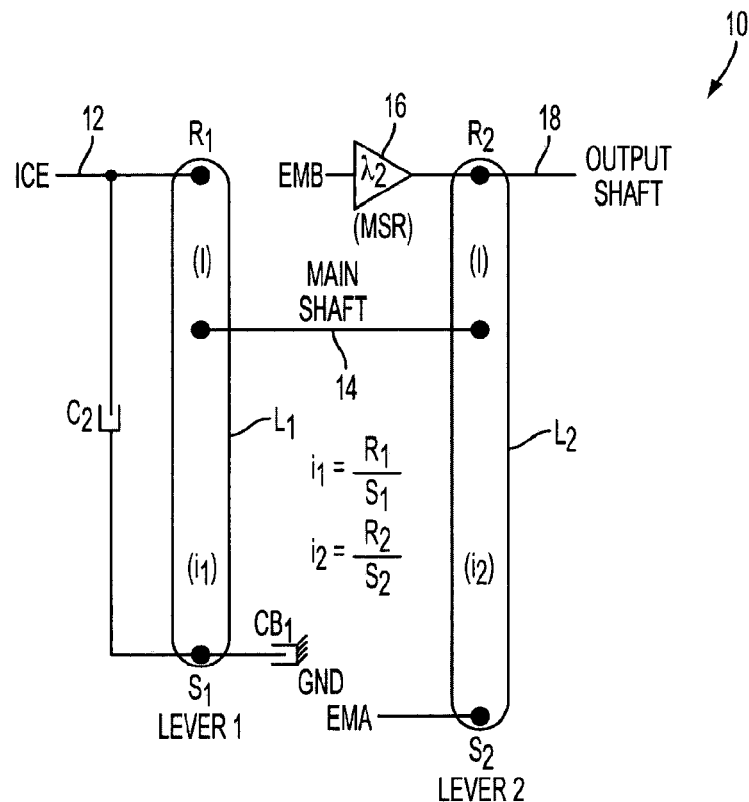
FIG. 1 is an illustration of a lever diagram of a drive system for a vehicle with an electrically variable transmission.

U.S. application Ser. No. 12/882,936, (the "'936 Application) filed Sep. 15, 2010 and titled "Multi-Speed Drive Unit," discloses various compound-input electrically variable transmissions ("EVT"), the disclosure incorporated herein by reference. U.S. application Ser. No. 13/188,799; filed Jul. 22, 2011; titled "Clutch System for a Transmission", the disclosure incorporated herein by reference, discloses a clutch system that can be used e.g., in the '936 Application's multi-speed drive unit to create a two dry "clutch" drive system, similar to a DDCT (dual dry clutch transmission), for the drive unit. FIG. 1 is an example lever diagram of such a drive system 10.

A seen in FIG. 1, the drive system 10 includes a first planetary gear set represented by a first lever $L_1$ and a second planetary gear set represented by a second lever $L_2$. A ring gear $R_1$ of the first planetary gear set is connected to an internal combustion engine ICE via an input shaft 12. A sun gear $S_1$ of the first planetary gear set is connected to two clutches $CB_1$, $C_2$. In the illustrated example, the first clutch $CB_1$ is a braking mechanism that, when activated, grounds the sun gear $S_1$ to the drive unit's transaxle case. When activated, the second clutch $C_2$ connects the sun gear $S_1$ to the engine. An input brake is created when both clutches $CB_1$, $C_2$ are activated at the same time.

The carriers of the planetary gear sets are connected via a main shaft 14. A sun gear $S_2$ of the second planetary gear set is connected to a first electric motor EMA. A ring gear $R_2$ of the second planetary gear set is connected to a second electric motor EMB via a motor speed reducer ("MSR") 16. The ring gear $R_2$ of the second planetary gear set is also connected to an output shaft 18. The motor speed reducer 16 controls the speed ratio between the second electric motor EMB and the output shaft 18.

The '936 Application discloses three input ratios. A first ratio is created by activating the first clutch $CB_1$ while deactivating the second clutch $C_2$. A second ratio is created by deactivating the first clutch $CB_1$ while activating the second clutch $C_2$. The third ratio is the input brake created by activating the first and second clutches $CB_1$, $C_2$. There is a need to control the drive system 10 to efficiently switch between drive modes and gear ratios to optimize the system's and vehicle's performance and to improve fuel economy.

Figure 2:
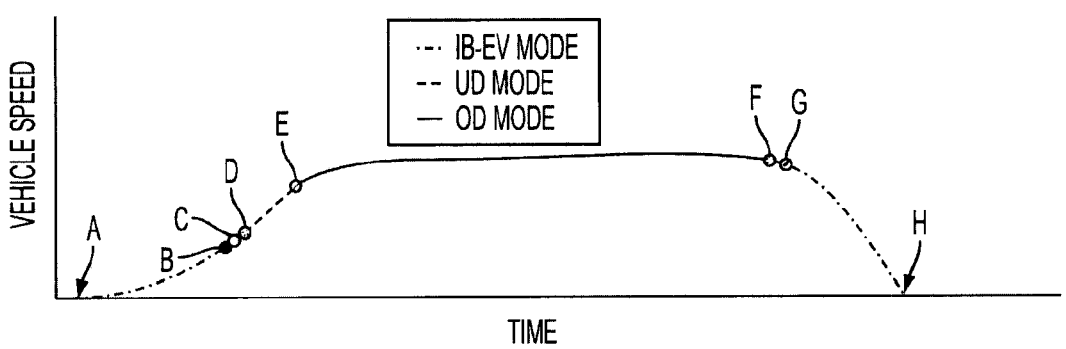
FIG. 2 is an illustration of an example drive cycle for a vehicle in accordance with the present disclosure.

FIG. 2 is an illustration of an example drive cycle for a vehicle containing a FIG. 1 drive system 10 and being controlled in accordance with the present disclosure. In the example, the vehicle accelerates from a stop, cruises at high speed and brakes to a stop. The various points and switching points of the drive cycle are listed in the table shown in FIG. 3.

During the cycle, the system 10 enters different modes to deliver the required output power from the electric motors and/or engine to the output shaft. The modes are chosen for best fuel economy and drive quality. The system 10 will operate in the following modes: input brake electric vehicle ("IB-EV"), under drive electric vehicle ("UD-EV"), over drive electric vehicle ("OD-EV"), under drive engine on ("UD-EO"), over drive engine on ("OD-EO"), and neutral (N). As shown in the table of FIG. 3, there are points and modes when the electric motors are propelling the vehicle without assistance from the engine (e.g., point A), propelling the vehicle with the assistance from the engine (e.g., points D to E) or providing regenerative braking (e.g., point G).

Both clutches $CB_1$ and $C_2$ will be applied (i.e., engaged or activated) to implement the IB-EV mode. The first clutch $CB_1$ will be applied while the second clutch $C_2$ is not applied (i.e., disengaged or deactivated) to implement the UD-EV and UD-EO modes. The first clutch $CB_1$ will not be applied while the second clutch $C_2$ is applied to implement the OD-EV and OD-EO modes. Both clutches $CB_1$ and $C_2$ will be disengaged in the neutral mode. It should be appreciated that this disclosure refers to the first clutch $CB_1$ as a braking clutch, but the disclosure is not limited to a braking clutch; as shown in the '936 application, many clutches or synchronizers could be used in the system 10.

The aspects of the present disclosure are designed to control the starting and shutdown of the engine ICE at certain points (i.e., points C and F) during the drive cycle. The engine start control method described herein is implemented on various components illustrated in FIG. 4, which is a block diagram of a portion of a vehicle's powertrain 400 constructed in accordance with the principles disclosed herein. The powertrain 400 incorporates a supervisory hybrid electric vehicle controller 402, an input speed profiler 404, a constraints evaluator 406, a feedforward controller 408, feedback controller 410, the engine, first and second clutches $CB_1$, $C_2$, first and second electric motor controllers 412, 414 for respectively controlling the first and second electric motors EMA, EMB, and a hybrid transmission plant 420.

The supervisory hybrid electric vehicle controller 402 inputs pedal position and various other vehicle operating conditions and parameters discussed herein. Outputs from the supervisory hybrid electric vehicle controller 402 are sent to the engine, clutches $CB_1$, $C_2$, input speed profiler 404 and constraints evaluator 406. Outputs from the engine, clutches $CB_1$, $C_2$, input speed profiler 404 and constraints evaluator 406 are used by the feedforward controller 408, and feedback controller 410 to control the motor controllers 412, 414 and the hybrid transmission plant 420 to perform, among other things, the engine start control process described below. Example inputs, outputs and functions of the supervisory hybrid electric vehicle controller 402 are described in U.S. application Ser. No. 61/513,080; filed Jul. 29, 2011; titled "Mode Selection Control System for an Electrically Variable Transmission", U.S. application Ser. No. 61/513,112; filed Jul. 29, 2011; titled "Motor Operation Control System for an Electrically Variable Transmission", and U.S. application Ser. No. 61/513,150;filed Jul. 29, 2011; titled "Shift Execution Control System for an Electrically Variable Transmission", the disclosures are each hereby incorporated herein by reference.

Figure 4:
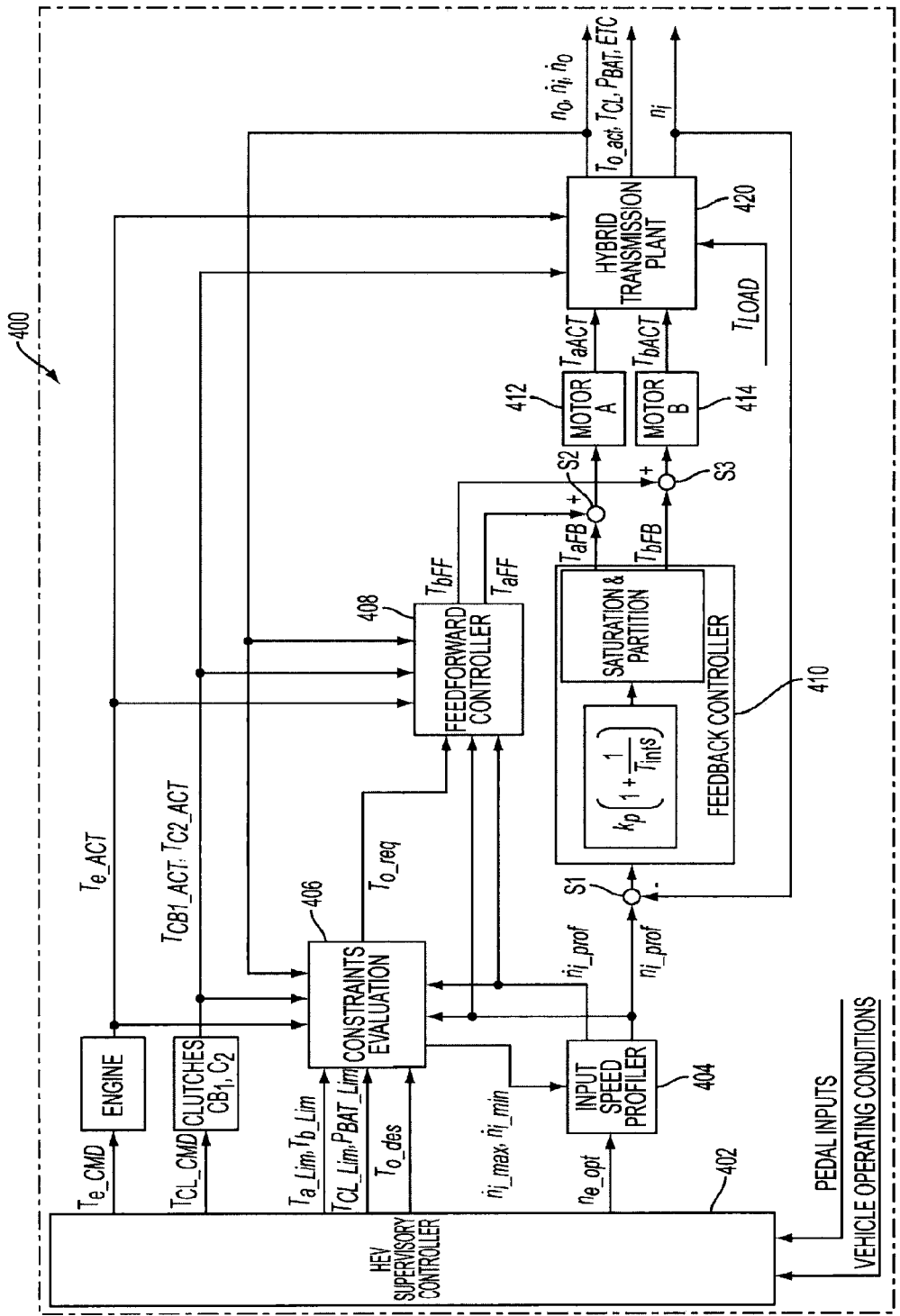
FIG. 4 is a block diagram of a portion of a vehicle's powertrain incorporating a controller for executing the methodology disclosed herein.

As shown in FIG. 4, the supervisory hybrid electric vehicle controller 402 outputs a torque engine $T_{e\_CMD}$ command to the engine and a torque clutch command $T_{T\_CMD}$ to the clutches. The supervisory hybrid electric vehicle controller 402 also outputs torque limits for both motors $T_{a\_Lim}$, $T_{b\_Lim}$ and the clutches $T_{CL\_Lim}$, a battery power limit $P_{BAT\_Lim}$ and a desired output torque $T_{o\_des}$ to the constraints evaluator 406. An optimum engine speed $n_{e\_opt}$ is output to the input speed profiler 404. An actual engine torque $T_{e\_ACT}$ is output from the engine to the constraints evaluator 406, feedforward controller 408 and the hybrid transmission plant 420. Actual first and second clutch torques $T_{CB\_ACT}$, $T_{C2\_ACT}$ are output from the clutches to the constraints evaluator 406, feedforward controller 408 and the hybrid transmission plant 420.

The constraints evaluator 406 additionally inputs an input (i.e., engine) speed profile $n_{i\_prof}$ and an input acceleration profile $\dot{n}_{i\_prof}$ from the input speed profiler 404, and the output speed $n_o$, output acceleration $\dot{n}_o$ and input acceleration $\dot{n}_i$ from the hybrid transmission plant 420. The constraints evaluator 406 outputs the maximum and minimum input accelerations $\dot{n}_{1\_max}$, $\dot{n}_{1\_min}$ to the input speed profiler 404, and the requested output torque $T_{o\_req}$ to the feedforward controller 408. The output speed $n_o$, output acceleration $\dot{n}_o$ and input acceleration $\dot{n}_i$ from the hybrid transmission plant 420 are also input by the feedforward controller 408. The feedforward controller 408 additionally inputs the input speed profile $n_{i\_prof}$ and the input acceleration profile $\dot{n}_{i\_prof}$ from the input speed profiler 404. The feedforward controller 408 outputs feedforward torques for the first and second electric motors $T_{aFF}$, $T_{bFF}$ to respective summation blocks S2, S3.

The input speed profile $n_{i\_prof}$ from the input speed profiler 404 is also output to a subtraction block S1, which also receives the input speed $n_i$ from the hybrid transmission plant 420. The difference between the input speed $n_i$ and the input speed profile $n_{i\_prof}$ is input by the feedback controller 410. The feedback controller 410 outputs feedback torques for the first and second electric motors $T_{aFB}$, $T_{bFB}$ to the summation blocks S2, S3, respectively. The first motor controller 412 inputs the summation of the feedforward first motor torque $T_{aFF}$ and the feedback first motor torque $T_{aFB}$. The second motor controller 414 inputs the summation of the feedforward second motor torque $T_{bFF}$ and the feedback second motor torque $T_{bFB}$.

The actual first motor torque $T_{aACT}$ and actual second motor torque $T_{bACT}$ are input by the hybrid transmission plant 420, which also inputs a load torque $T_{Load}$. The hybrid transmission plant 420 also outputs the actual output torque $T_{o\_act}$, clutch torque $T_{CL}$, battery power $P_{BAT}$ and other parameters used by the powertrain 400.

As noted above, a vehicle with the disclosed powertrain 400 can operate in many modes depending on the states of the first and second clutches $CB_1$, $C_2$. In the IB-EV mode, the engine is held stationary by the "brake" clutch $CB_1$ and the second clutch $C_2$. Only the high-voltage battery provides the motive power to propel the vehicle using the two electric motors EMA and EMB (i.e., electric vehicle or EV drive). The under drive modes enable a higher ratio between the engine and the main planetary gear carrier and provide more output torque for lower engine torque. The over drive modes enable a lower ratio between the engine and the main planetary gear carrier. This mode moves engine operation to a higher torque lower RPM condition for the same engine power.

During the EV modes illustrated in FIGS. 2 and 3, when more motive power is needed to accelerate the vehicle or initiate travel at higher speeds, the engine has to be fired to generate additional power to meet the driver's demand (i.e., initiating a hybrid drive). The transitional period from the EV drive mode to the hybrid drive mode using the combustion engine and the power from the battery/electric motors is referred to as "engine starts."

Engine starts can be performed when switching from EV drive to either the UD or OD with engine on (EO) modes. One of the clutches $CB_1$ (for IB to OD) or $C_2$ (for IB to UD) needs to be disengaged prior to starting the engine. For instance, for the IB to UD transition, when the engine start control system receives the request to crank up the engine, it first relays the request to disengage the second clutch $C_2$ in a controlled manner. At the same time, the pressure on the first clutch $CB_1$ is maintained so that the first clutch $CB_1$ remains fully engaged.

The objective of engine starts from IB to UD can be described as follows: use electric motor torques to generate input acceleration $\dot{n}_i$ and speed up the engine, at the same time, the electric motor torques are coordinated to meet the driver's torque request $T_{o\_req}$. During the process, engine torque $T_e$ and slipping clutch torque $T_{C2}$ are treated as known disturbances. The feedforward motor torques $T_{aFF}$ and $T_{bFF}$ for the engine start control can be determined by the feedforward controller 408 as follows:

$$\begin{bmatrix} T_{aFF} \\ T_{bFF} \\ T_{CB1} \end{bmatrix} = \begin{bmatrix} * \\ * \\ * \end{bmatrix} \cdot T_{o\_req} + \begin{bmatrix} * & * \\ * & * \\ * & * \end{bmatrix} \cdot \begin{bmatrix} T_{e\_ACT} \\ T_{C2\_ACT} \end{bmatrix} + \begin{bmatrix} * & * & * & * \\ * & * & * & * \\ * & * & * & * \end{bmatrix} \cdot \begin{bmatrix} \dot{n}_{i\_prof} \\ \dot{n}_o \\ n_{i\_prof} \\ n_o \end{bmatrix} \quad (1)$$

$\dot{n}_{i\_prof}$ and $n_{i\_prof}$ are the desired engine acceleration and speed during starts. The shape of the desired engine speed can be tailored for different engine starting types, such as smooth starts or aggressive starts (in the input speed profiler 404 using e.g., $n_{e\_opt}$). Furthermore, the peak acceleration during engine start events has to be restricted within motor/clutch torque limits and battery power limits as shown below:

$$\begin{bmatrix} T_{aFF} \\ T_{bFF} \\ T_{CB1} \end{bmatrix} = \begin{bmatrix} * \\ * \\ * \end{bmatrix} \cdot \dot{n}_{i\_lim} + \begin{bmatrix} * & * & * \\ * & * & * \\ * & * & * \end{bmatrix} \cdot \begin{bmatrix} T_o \\ T_{e\_ACT} \\ T_{C2\_ACT} \end{bmatrix} + \begin{bmatrix} * & * & * \\ * & * & * \\ * & * & * \end{bmatrix} \cdot \begin{bmatrix} \dot{n}_o \\ n_o \\ n_i \end{bmatrix} \Rightarrow \quad (2)$$

$$\begin{cases} \dot{n}_{i\_max} \\ \dot{n}_{i\_min} \end{cases}$$

$T_{CB1}$ is the reaction torque of the engaged grounding clutch $CB_1$. Unlike the feedforward torques $T_{aFF}$ and $T_{bFF}$, $T_{CB1}$ is not actively adjusted during the starting process, but the torque limit of $CB_1$ (determined by the clamping pressure, disc dimension and friction material) will impose constraints on the magnitude of peak input acceleration and admissible motor torques. On the right hand side of the above equation, all terms can be measured or estimated except $T_{o\_req}$. However, given torque limits $T_{a_{min}}$, $T_{b_{min}}$, $T_{b_{max}}$, $T_{CB1_{min}}$, $T_{CB1_{max}}$, as well as battery power limits $P_{BAT_{min}}$ and $P_{BAT_{max}}$, the constraints on $T_{o\_req}$ can be determined. Moreover, during short-duration events such as engine start, the second electric motor's torque limit $T_{b_{max}}$ can be raised using a boost of a higher current/voltage. In the end, the feedforward motor torques for engine-start control $T_{aFF}$ and $T_{bFF}$ can be obtained since all the right hand terms are available.

Due to model inaccuracy and uncertainties, however, the feedforward control alone cannot guarantee robust tracking of desired engine speed. The feedback controller 410 implemented as proportional-integral ("PI") generates complementary motor torque commands $T_{aFB}$, $T_{bFB}$ based on the deviation of actual engine speed from the desired one:

$$\begin{bmatrix} T_{aFB} \\ T_{bFB} \end{bmatrix} = PI(n_{i\_prof} - n_i) \quad (3)$$

Figure 5:
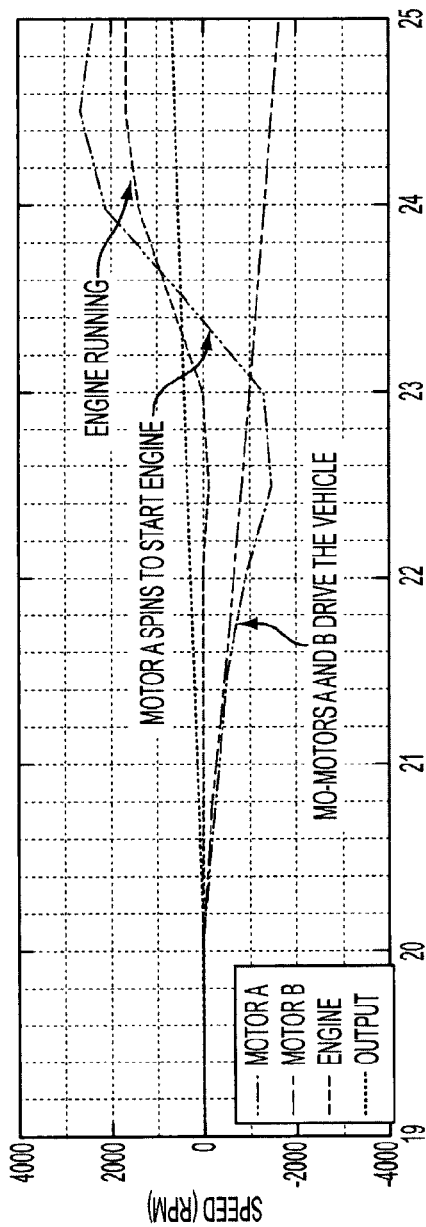
FIG. 5 is a graph of engine, motor and output speeds versus time for electric vehicle operation in accordance with the present disclosure.
Figure 6:
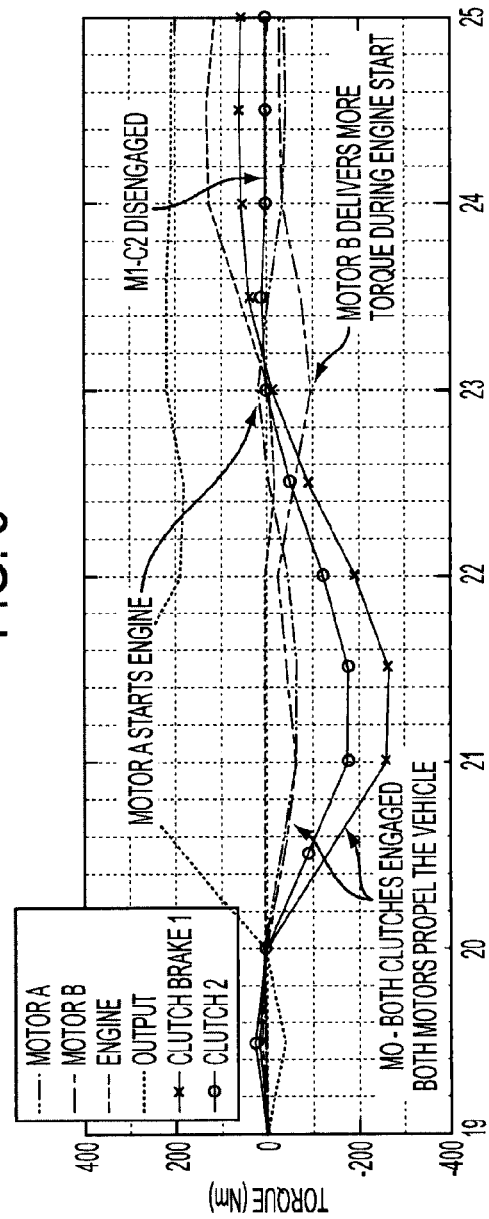
FIG. 6 is a graph of engine, motor and output torques versus time for under and over drive modes of operation in accordance with the present disclosure.

The final motor torque commands are combined and sent to the two electric motor controllers 412, 414. The actual motor torques, along with the actual engine torque and the off-going clutch torque, are the inputs to the physical transaxle system. The input torques overcome the load torque and generate accelerations to the input and output shafts. FIGS. 5 and 6 illustrate an example of vehicle responses and major variable traces during a drive cycle.

The above-described engine start control system and method achieve a coordinated and robust control of the electric motor torques and clutch torques, which enable the transition from electric vehicle drive to hybrid drive while also meeting output torque request and actuator constraints. The system and method disclosed herein enable the transition of the engine speed from 0 RPM (in the IB-EV mode) to a desired level in under drive or over drive modes using the coordinated control of the electric motor torques and clutch torques. The system and method described herein ensures smooth and customizable engine starting quality and favorable drivability during the transition.

What is claimed is:
1. An engine start control system for a vehicle having an electrically variable transmission, said control system comprising:
   a supervisory controller adapted to input vehicle operating conditions and driver inputs, said supervisory controller adapted to determine and output a plurality of torque limits, a desired output torque, and an optimum engine speed;
   an input speed profiler adapted to generate and output an input speed profile and an input acceleration profile based on the optimum engine speed;
   a constraints evaluator adapted to generate and output a requested output torque based on the plurality of torque limits and desired output torque;
   a feedforward controller adapted to generate first and second feedforward motor torques based on the requested output torque and the input speed and input acceleration profiles;
   a feedback controller adapted to generate first and second feedback motor torques based on a difference between the input speed profile and an actual input speed;
   a first electric motor controller that receives a summation of the first feedforward and feedback torques and gen- erates an actual first motor torque used to control the first electric motor when the engine is being turned on or off; and a second electric motor controller that receives a summation of the second feedforward and feedback torques and generates an actual second motor torque used to control the second electric motor when the engine is being turned on or off.

2. The control system of claim 1, wherein the driver inputs comprise at least a throttle position.

3. The control system of claim 1, wherein the constraints evaluator is further adapted to output a minimum input acceleration threshold and a maximum input acceleration threshold and said input profiler uses the minimum and maximum input acceleration thresholds when generating the input speed profile and the input acceleration profile.

4. The control system of claim 1, wherein the supervisory controller is further adapted to output an engine torque command to the vehicle engine.

5. The control system of claim 4, wherein the engine is adapted to output an actual engine torque to the constraints evaluator and the feedforward controller, the constraints evaluator uses the actual engine torque when generating the requested output torque, and the feedforward controller uses the actual engine torque when generating the first and second feedforward motor torques.

6. The control system of claim 1, wherein the supervisory controller is further adapted to output a clutch torque command to first and second clutches of the transmission.

7. The control system of claim 6, wherein the first and second clutches are respectively adapted to output first and second actual clutch torques to the constraints evaluator and the feedforward controller, the constraints evaluator uses the first and second actual clutch torques when generating the requested output torque, and the feedforward controller uses the first and second actual clutch torques when generating the first and second feedforward motor torques.

8. The control system of claim 1, wherein the plurality of torque limits comprises a first electric motor torque limit, a second electric motor torque limit, a clutch torque limit, and a battery power limit.

9. The control system of claim 1, further comprising a hybrid transmission plant adapted to input the actual first and second motor torques, a load torque, actual engine torque and actual first and second clutch torques, said hybrid transmission plant being adapted to output an actual output speed and acceleration and an actual input speed and acceleration.

10. The control system of claim 9, wherein the constraints evaluator uses the actual output speed and acceleration and the actual input acceleration when generating the requested output torque, and the feedforward controller uses the actual output speed and acceleration and the actual input acceleration when generating the first and second feedforward motor torques.

11. A method of controlling first and second electric motors of a vehicle having an electrically variable transmission during an engine start/stop operation, said method comprising using a processor to:
   determining an input speed profile and an input acceleration profile based on an optimum engine speed;
   determine a requested output torque based on a plurality of torque limits and a desired output torque;
   determine first and second feedforward motor torques based on a requested output torque and the input speed and input acceleration profiles;
   determine first and second feedback motor torques based on a difference between the input speed profile and an actual input speed;
   sum the first feedforward and feedback motor torques and generate an actual first motor torque;
   sum the second feedforward and feedback motor torques and generate an actual second motor torque; and
   using the actual first and second motor torques to respectively control the operation of the first and second electric motors when the engine is being turned on or off.

12. The method of claim 11, wherein the optimum engine speed, torque limits and desired output torque are determined using vehicle operating conditions and a vehicle throttle position.

13. The method of claim 11, further comprising:
   generating a minimum input acceleration threshold;
   generating a maximum input acceleration threshold; and
   ensuring that the input acceleration profile is constrained with the minimum and maximum input acceleration thresholds.

14. The method of claim 11, further comprising determining an actual engine torque and using the actual engine torque when determining the requested output torque and the first and second feedforward motor torques.

15. The method of claim 11, further comprising:
   determining a clutch torque command; and
   outputting the determined clutch torque command to first and second clutches of the transmission.

16. The method of claim 11, wherein the plurality of torque limits comprises a first electric motor torque limit, a second electric motor torque limit, a clutch torque limit, and a battery power limit.

17. The method of claim 11, further comprising determining an actual output speed and acceleration and an actual input speed and acceleration based on the actual first and second motor torques, a load torque, actual engine torque and actual first and second clutch torques.

* * * * *